Patented Sept. 1, 1931

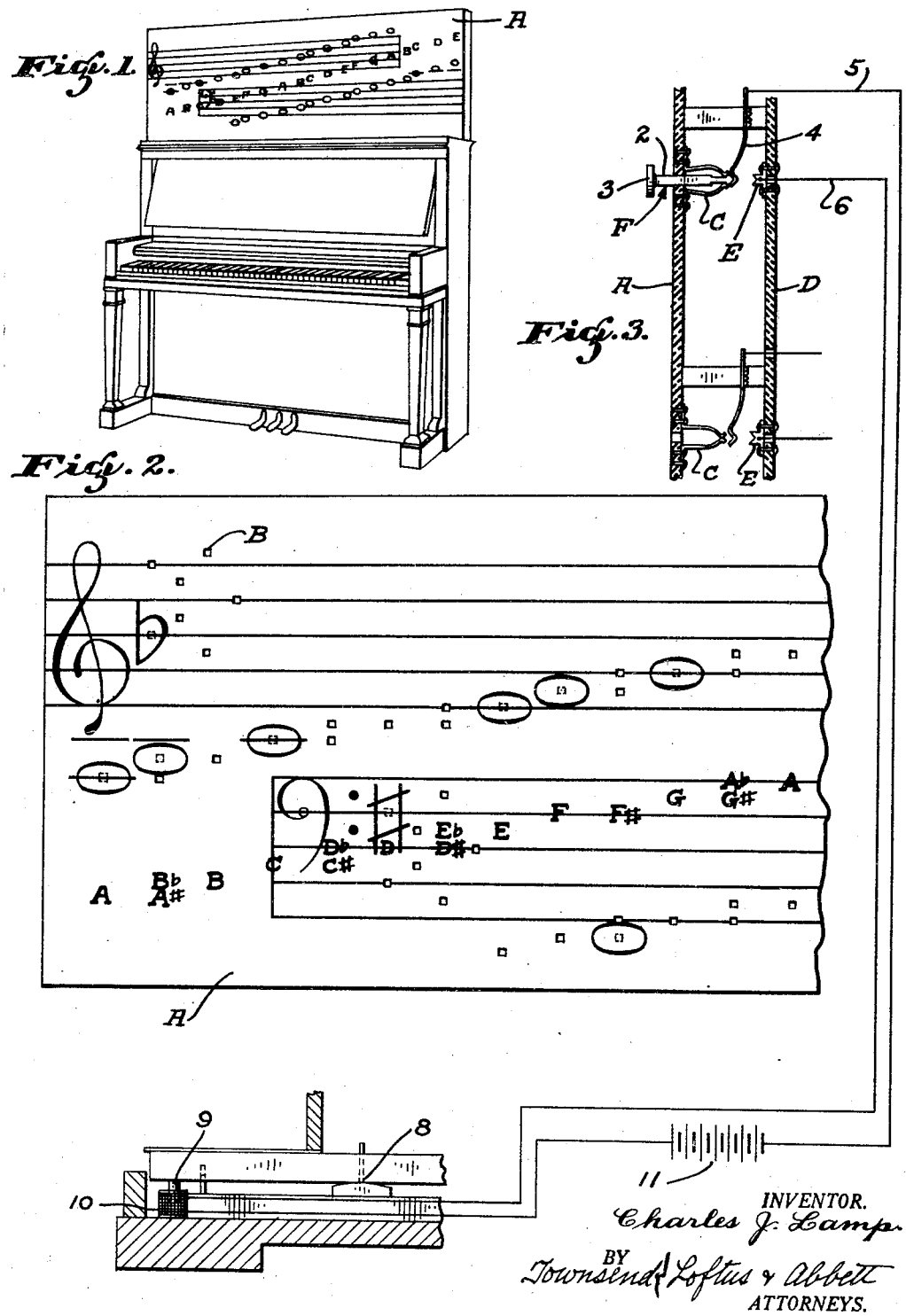

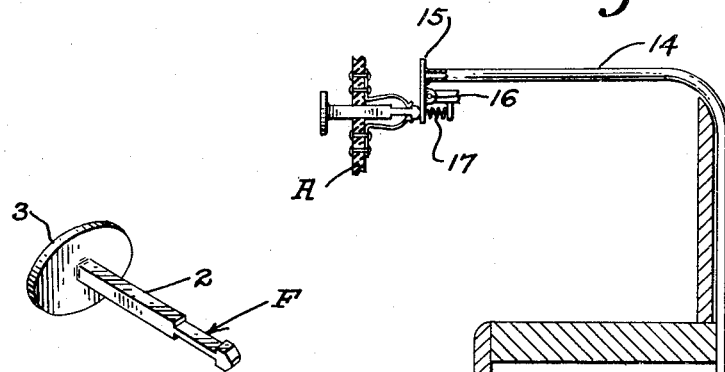
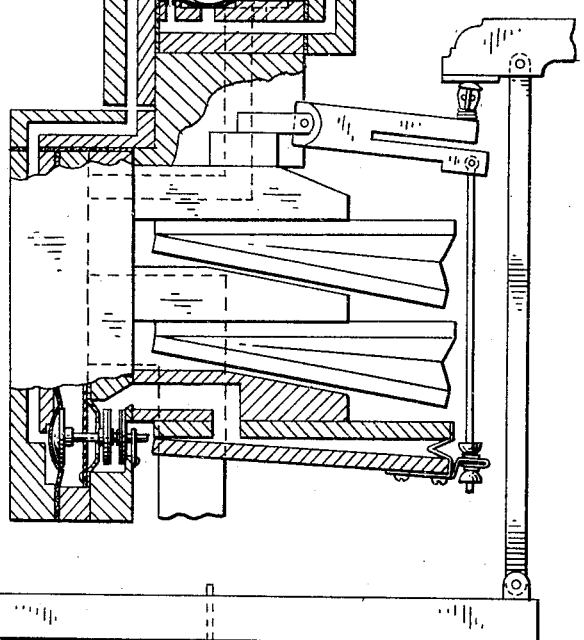

1,821,311

UNITED STATES PATENT OFFICE

CHARLES J. LAMP, OF SAN FRANCISCO, CALIFORNIA

APPARATUS FOR TEACHING SIGHT-SINGING

Application filed November 26, 1930. Serial No. 498,383.

This invention relates to an apparatus to be used in teaching sight-singing, ear training, note reading and certain elements of music theory, namely, the construction of scales and intervals and certain elements of notation.

In sight-singing the two major problems which confront the teacher are conveying, to the pupils, the conceptions, first, the relative pitch between the notes in the music which they are trying to read and sing, and secondly, the relative time value of these notes, (the latter is not included in this invention).

In sight-singing and ear training certain tone sequences are taught, in order to inculcate a sort of "tonal feeling" known as the sense of relative pitch. They are first, the various scales, secondly, the various tone intervals, and, third, simple chords and arpeggios.

The object of the present invention is to generally improve and simplify an apparatus heretofore employed in teaching sight-singing and particularly to provide an apparatus whereby a singer may be taught and trained to match audibly with his voice, the tone he hears mentally as being the pitch of the note being read, that is, a psychological coordination of note read and corresponding pitch heard, mentally first and then audibly through vocalization; to provide an apparatus whereby the scales, various tone intervals and simple chords and arpeggios may be readily taught, both visually and audibly; to provide an apparatus whereby the construction of all scales whether C major, or otherwise, may be visually and audibly demonstrated so as to bring out the need of sharps and flats in different scales; to provide an apparatus whereby the relation between the bass and treble clefs may be visually and audibly demonstrated; to provide an apparatus whereby the half and whole steps between different notes or symbols on the staff which comprise the various tone intervals can be explained and demonstrated both visually and audibly; to provide an apparatus whereby the construction of chords and the corresponding arpeggios can be both visually and audibly demonstrated; to provide an apparatus whereby the relative differences in pitch between the notes that comprise the various major and minor augmented and diminshed intervals may be both visually and audibly checked; to provide an apparatus whereby the relative differences in pitch between the various lines and spaces of the staff or staves may be visually and audibly demonstrated; and, further, to provide an apparatus whereby the elements of notation such as the staff, the clefs, the key signatures, the various kinds of notes, the various kinds of accidentals, etc., may be taught visually and audibly.

The invention is shown by way of illustration in the accompanying drawings, in which—

Fig. 1 is a perspective view of a piano showing the chart mounted thereon,

Fig. 2 is an enlarged view of a portion of the chart,

Fig. 3 is an enlarged section of the chart, said view also showing the manner in which it is electrically connected with the keys of the piano to sound the same, Fig. 4 is a section similar to Fig. 3, but showing the keys pneumatically actuated, Fig. 5 is a perspective view of one of the note plugs.

Referring to the drawings in detail and particularly Figs. 2 and 3, A indicates in general a front panel on which is displayed the staffs, including the bass and treble. Formed in the panel are a plurality of square shaped openings generally indicated at B, these openings being placed on and between the lines of the staff, and secured to the rear side of the panel in alignment with each hole are a pair of spring arms C, the function of which will hereinafter be described. Disposed rearwardly of the panel A is a second panel D and mounted thereon in alignment with the openings B are electrical contacts E, there being one for each opening or hole formed in the front panel. Note plugs generally indicated at F, see Figs. 3 and 5, are insertable in the holes B. The shank 2 of each note plug is square in cross section to fit the holes B so as to prevent rotation in the holes. When these plugs are inserted in one or more of the holes they are retained by the spring arms C and if a plug is pushed inwardly until the head member 3 substantially engages the front face of the panel engagement will be made with a contact arm 4 and this will be moved into engagement with the contact member E and thereby close a circuit through the wires 5 and 6. The contact arms 4 are made of spring metal or the like and as such are sufficiently flexible to move from one position to another and to return to normal inoperative position when the plugs are partially or wholly withdrawn.

The head members 3 formed on the respective plugs are shaped as shown in Figs. 2 and 5, that is, to resemble certain notes. When they are all removed the treble and bass clef staffs are blank and when one or more are inserted, certain notes will be displayed. This is one of the main features of the invention as it is the purpose of the present method and apparatus to visually display the notes to be read and sung, and it is also the purpose of the present method and apparatus to be able to sound any particular note, this being accomplished through the closing of an electric circuit through the contacts 4 and E.

In Fig. 3, the method of sounding employed is electric. The keys of the piano are pivotally mounted as at 8 in the usual manner. An armature member 9 is secured to the front end of each key and this projects into a solenoid magnet 10 disposed below the same. This magnet is connected through wires 5 and 6 with the contacts 4 and E and also with a source of current supply as the battery indicated at 11, hence if a note plug is inserted on or between any given line of the staff to assume the position shown in Fig. 3, the note will be visibly displayed and if it is desired to sound that particular note it is accomplished by merely pressing inwardly on the note plug so as to bring the contacts in engagement. Such engagement closes the circuit through the battery 11 and the magnet 10 and causes energization thereof, thus depressing or striking the key and sounding that particular note.

In actual practice the chart may be placed on top of a piano as shown in Fig. 1. The teacher explains to the pupil that the octave includes 12 equal tone steps called half steps or half tones. This fact is then shown to be true by playing the cromatic scale on the piano including all keys black and white within the range of one octave. The teacher then points out on the chart that holes are provided for the reception of note plugs for each of the symbols that stand for each of the tones. This fact is shown to be true by inserting the respective note plugs in the openings formed in the chart, with the result that the chromatic scale is visibly displayed, and secondly, by pressing inwardly on the keys it is possible to sound the scale audibly.

The construction of the major scale may now be explained; it is a sequence of two whole steps, one-half step, three whole steps and one half step. As the plug holes are spaced an equal horizontal distance apart a true visible conception is possible through the use of this chart as the note plugs which symbolize the tones which are a whole step apart will be twice as far apart as those that symbolize the tones that are only half a step apart. A true conception of the location of the half steps and whole steps in the various scales is not shown visually by present methods but by this method it is plainly demonstrated. This method has further advantages, for instance, assume that a scale has been constructed upon it, the tones that correspond to the notes on the staff may be heard by pressing in each note plug thereby sounding the corresponding key of the piano or other instrument, hence the teacher is first able to visibly construct and display the scale and then to sound the notes displayed thus providing a method whereby the singer or pupil may be taught and trained to match audibly with his voice the note he sees, that is, a psychological coordination of note read and corresponding pitch heard mentally first and then audibly through vocalization.

The half and whole steps between various notes on the staff which comprise the various tone intervals can be visibly displayed and audibly checked again giving the student a true relation between note displayed and the tone which is represented.

The construction of chords and corresponding arpeggios can be readily demonstrated both visibly and audibly.

By the construction of scales starting on tones other than C major, the need of sharps and flats in various scales can be visually shown and audibly checked.

The relative difference in pitch between notes that comprise the various major and minor augmented and diminished intervals can be visually displayed and audibly checked. All the elements of notation such as the staff, the clef, the key signatures, the various kinds of notes, the various kinds of accidentals are readily taught.

The construction of the chart also affords a visual aid in showing the relation of bass and treble clef with an audible check, for example, by pressing a note plug in the hole for the *a* second line below treble clef and next pressing a note plug in the top line of the bass clef, the tone which is heard, by further depression of these two note plugs, will be identical in pitch thereby checking audibly what the chart displays visually. This true conception is seldom obtained, except by pianists as they use both clefs; singers and instrumentalists do not.

Notes related en-harmonically (A flat and

B sharp for example) can be audibly checked as to the sameness or pitch by inserting the proper note plug in the holes provided and then sounding them.

It should be noted that the invention has the advantage in that the teacher does not need to know how to play the piano, the only requirement being that of note reading, scale construction and other elements of music which the teacher is trying to convey to the pupil.

The sound producing agent is not limited to a piano as other tone producing chromatically tuned instruments might be operated either electrically, or pneumatically, for instance chimes, bells, whistles, or an organ may be employed. By referring to Fig. 4, it will be noted that a modification of Fig. 3 is shown. In Fig. 3, the piano keys 7 are electrically actuated. In Fig. 4 a standard form of pneumatically actuated mechanism is shown. In this instance, each tube indicated at 14 is provided with a valve 15 at its upper end. This valve is hinged as at 16 and is held in a closed position by a spring 17. The note plug projecting through the front panel A aligns with the lower end of the valve, hence when the note plug is merely inserted for display valve 15 is not actuated but if it is further depressed valve 15 is opened and the connected pneumatic mechanism is actuated to depress the key. It should accordingly be understood that the present invention is not limited to electric actuated means or pneumatic, as other means may be employed.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In an apparatus of the character described a panel having a plurality of perforations formed therein, said panel having a staff displayed on one side thereof, the perforations being positioned on and between the lines of the staff, plugs insertable in the perforations, a head member on each plug and displaying notes, a chromatically tuned sounding instrument, a spring actuated arm cooperating with each plug and normally maintaining the plugs in a partially extended position, means whereby depression of a plug imparts movement to the cooperating spring actuating arm, and means whereby movement of a cooperating spring actuated arm actuates the sounding instrument.

2. In an apparatus of the character described a panel having a plurality of perforations formed therein, said panel having a staff displayed on one side thereof, the perforations being positioned on and between the lines of the staff, plugs insertable in the perforations, a head member on each plug and displaying notes, a chromatically tuned sounding instrument, a spring actuated arm, one for each plug and cooperating therewith to normally maintain the plugs in the partially extended position, means whereby depression of a plug imparts movement to the co-operating spring arm, means whereby movement of a cooperating spring arm closes an electric circuit, and means energized by the closing of said circuit whereby the sounding instrument is actuated.

CHARLES J. LAMP.